UNITED STATES PATENT OFFICE.

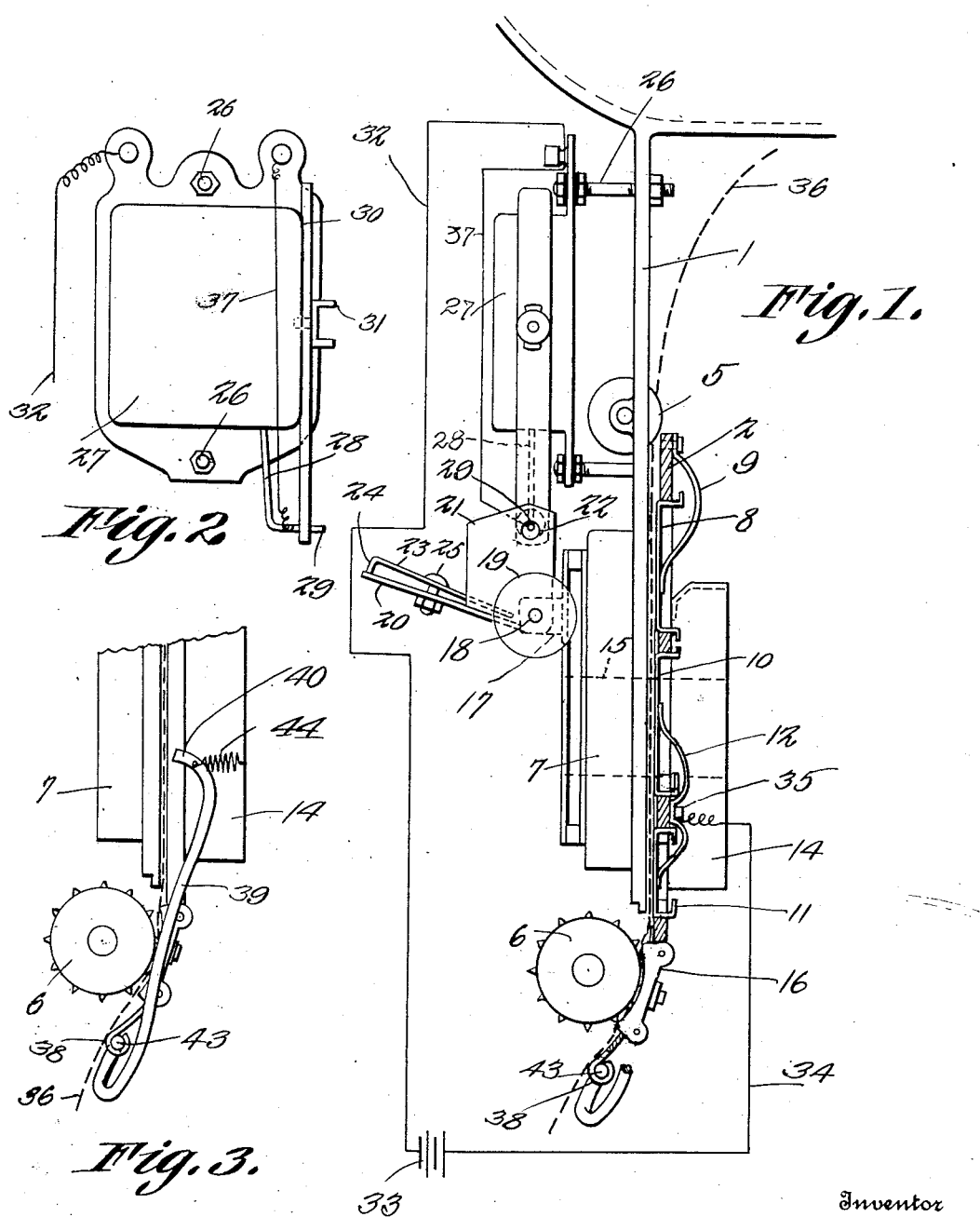

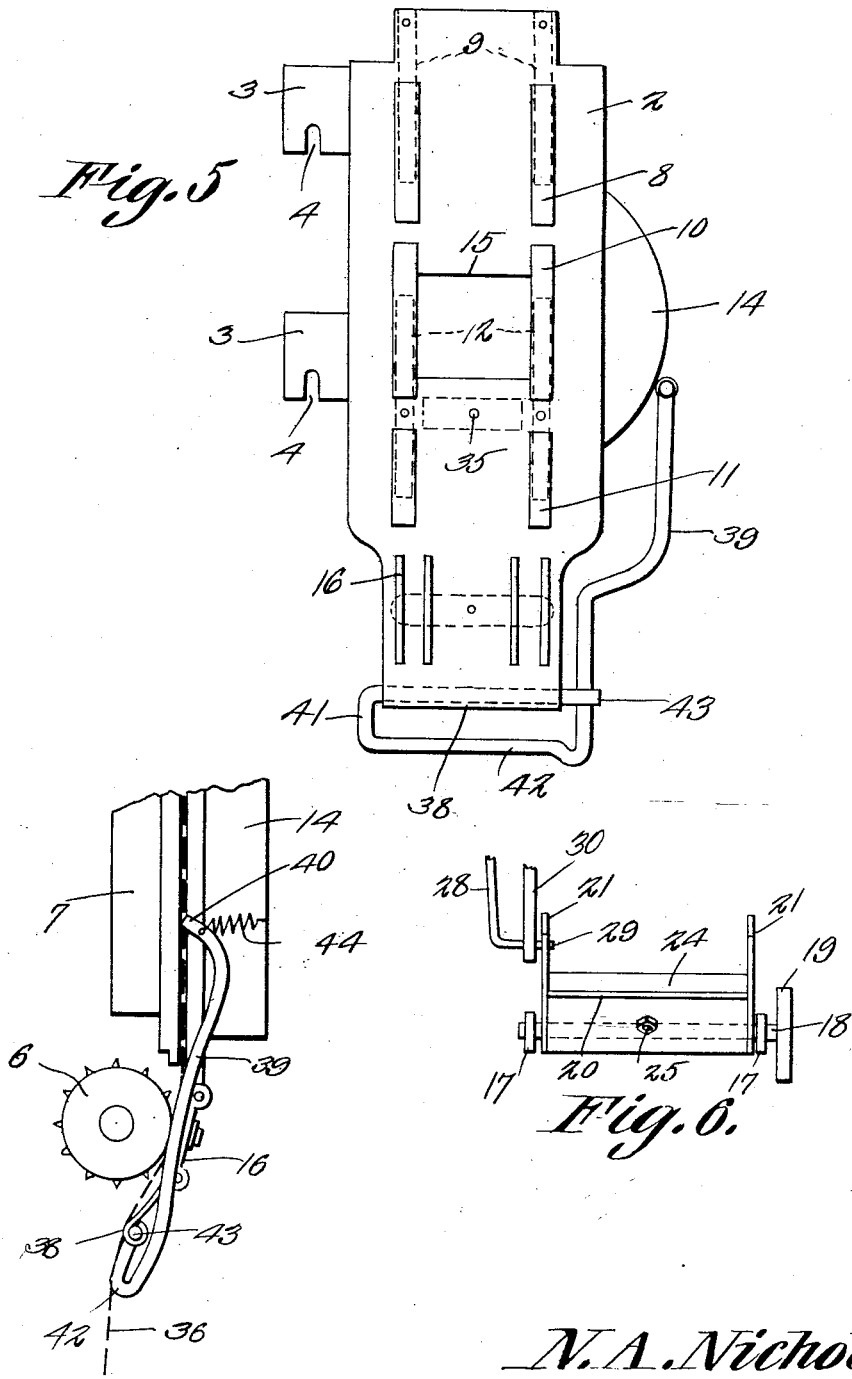

NICHOLAS A. NICHOLSON, OF JOHNSTOWN, PENNSYLVANIA.

FIRE-PROTECTOR.

1,396,656.  Specification of Letters Patent.  Patented Nov. 8, 1921.

Application filed July 20, 1920. Serial No. 397,674.

*To all whom it may concern:*

Be it known that I, NICHOLAS A. NICHOLSON, a citizen of the United States, residing at Johnstown, in the county of Cambria and State of Pennsylvania, have invented a new and useful Fire-Protector, of which the following is a specification.

By way of explanation, it may be stated that so long as the film in a moving picture machine advances at normal speed, the heat from the lamp is not sufficient to ignite the film. If, however, due to a break, or any other cause, the film stops for a short period, in the path of the light rays from the lamp, the heat from the lamp is sufficient to ignite the film with obviously diastrous results.

The foregoing being understood, it may be stated that the present invention aims to provide novel means whereby, when a film in a motion picture machine stops, a shutter will be interposed between the lamp and the film.

Another object of the invention is to provide novel means whereby the operator of a motion picture machine will be advised when there is too much tension on the film.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a portion of a moving picture machine whereunto the device forming the subject matter of this application has been applied; Fig. 2 is an elevation showing the buzzer and attendant parts; Fig. 3 is a side elevation showing the arm in retracted position; Fig. 4 is a similar view showing the arm in advanced position; Fig. 5 is a plan showing the film trap door; and Fig. 6 is a fragmental elevation showing the shutter and attendant parts.

The numeral 1 denotes a portion of the frame of a motion picture machine. The numeral 2 marks a plate, often known as the film trap door, the plate having projections 3 provided with notches 4 whereby the plate 2 may be connected readily with the frame 1. The plate 2 is insulated from the frame 1. A roller 5 is journaled on the frame 1 adjacent to the upper end of the plate 2. The numeral 6 denotes the sprocket over which the film 36 passes. There is a hood 7 on the frame 1, the plate 2 being provided with a hood 14, there being an opening 15 in the plate 2. The film 36 moves across the opening 15, and it is through the opening that the projection is accomplished. Upper guides 8 are movable in the plate 2 and are advanced by springs 9. Intermediate guides 10 and lower guides 11 are shown, the guides 10 and 11 being advanced by the end portions of springs 12, secured intermediate their ends to the plate 2. At its lower end, the plate 2 carries guides 16 coöperating with the sprocket wheel 6. All of the foregoing elements are common and well known in the art.

The hood 7 is supplied with ears 17 wherein a shaft 18 is mounted to rock, the shaft being provided at one end with a finger wheel 19. The shaft 18 carries a shutter, made up of a main plate 20, attached to the shaft 18, and an auxiliary plate 23 having a flange 24 engaging the plate 20, the plates 20 and 23 being connected by a securing device 25.

The main plate 20 is supplied with a wing 21 having an opening 22.

By means of bolts 26 or the like, a buzzer 27 is connected to the frame 1. The lever of the buzzer is shown at 28 and includes an angularly disposed finger 29, adapted to be received in the opening 22 in the wing 21 of the shutter. The finger 29 operates in a guide 30 secured by a screw 31 to the casing of the buzzer 27. From one pole of the buzzer 27, a conductor 32 leads to a battery 33. From the battery 33, a conductor 34 leads to the plate 2, the conductor being connected to the plate, as indicated at 35. A conductor 37 leads from the finger 29 of the buzzer lever 28 to one pole of the buzzer.

At its lower ends, the plate 2 is supplied with a bearing 38. The numeral 39 denotes an arm terminating in a finger 40. At the other end of the arm 39 there is a loop-shaped head 41 including an end bar 42 and an intermediate bar 43. The intermediate bar 43 is mounted in the bearing 38 to rock therein, the bar 42 being located blow the bearing. A spring 44 is connected to the upper portion of the arm 39 and tends to retract the finger 40 out of engagement with the framework 1 of the machine, as shown in Fig. 3 on the drawings. The film 36 as it moves downwardly traverses the bearing 38, and is adapted to coöperate with the end bar 42, in a way to be pointed out hereinafter.

In practical operation, the shaft 18 is rotated by means of the finger wheel 19, and the shutter 20—23 is swung upwardly into the position of Fig. 1, the finger 29 of the buzzer lever 28 being engaged in the opening 22 of the wing 21, to hold the shutter elevated. The electrical circuit includes the buzzer 27, the conductor 32, the battery 33, the conductor 34 and the plate 2. At this point, let it be recalled that the plate 2 is insulated from the frame 1. Proceeding from the plate 2, the circuit includes the guides 10, 8 and 11, these guides being insulated, ordinarily, from the frame 1, by the film 36. The circuit includes the plate 1, the wing 21, the finger 29 and the conductor 37. Under ordinary conditions, the circuit above described is open, because the film 36 passes between the frame member 1 and the guides 8—10—11. If, however, the film should break, then the film will no longer be interposed between the guides and the frame 1, and one or more of the guides, under the impulse of their respective springs, will engage the plate 1, closing the circuit. As soon as the circuit is closed, the lever 28 of the buzzer will be operated, the magnet of the buzzer being energized, the armature being attracted, and the finger 29 being withdrawn from the hole 22 in the wing 21, permitting the shutter 23—20 to swing downwardly into closed position with respect to the opening 15. There is an advantage in grounding the circuit to the frame 1 by way of the finger 29 and the shutter wing 21, since, when the shutter is closed, the circuit is opened. If the circuit were completed in some manner other than through the wing 21 and the shutter 20—23, then, when the film 36 broke permitting the guide to come into engagement with the frame 1, the circuit would be closed and would remain closed until the film were introduced again between the plate 2 and the frame 1. With the construction described and shown in the drawings, the circuit is opened as soon as the wing 21 swings downwardly with respect to the finger 29, after the finger 29 has been retracted.

Very often, there will be a drag on the upper portion of the film, too much tension being put on the film in the magazine. As a result, the film breaks. In the device forming the subject matter of this application, as soon as an unusual amount of tension is put on the film, the film comes into contact with the end bar 42 of the arm 39, swinging the upper end of the arm forwardly and overcoming the pull of the spring 44, as shown in Fig. 4, the finger 40 engaging the frame 1 and closing the circuit. Thereupon, the shutter 23—20 drops and the light is cut off, the operator being notified that there is too much tension on the film.

Having thus described the invention, what is claimed is:—

1. In a motion picture machine employing a film, a frame; a plate disposed approximately parallel to the frame and spaced therefrom for the passage of the film the plate having an opening; a shutter controlling the opening and mounted to swing on an axis approximately parallel to the plate; a buzzer including a member mounted to move in a direction approximately parallel to the plate and coöperating with the shutter to hold the shutter raised and in open position; and a circuit including the buzzer, the circuit being maintained open by the film when the film is in its normal place, and being closed when the film is in abnormal position.

2. In a motion picture machine employing a film, a frame; a plate disposed approximately parallel to the frame and spaced therefrom for the passage of the film, the plate having an opening; a shutter controlling the opening and mounted to swing on an axis approximately parallel to the plate; an audible signal including a member mounted to move in a direction approximately parallel to the plate and coöperating with the shutter to hold the shutter raised and in open position; and a circuit including the audible signal, the circuit being maintained open by the film when the film is in its normal place, and being closed when the film is in abnormal position.

In testimony that I claim the foregoing as my own, I have hereto affixed my signature in the presence of one witness.

NICHOLAS A. NICHOLSON.

Witness:
  A. W. JOSOPAIT.